United States Patent [19]

Emsens

[11] Patent Number: 4,893,553
[45] Date of Patent: Jan. 16, 1990

[54] MACHINE FOR THE AUTOMATIC PRODUCTION OF MEAT AND/OR VEGETABLE KEBABS THREADED ONTO SKEWERS

[75] Inventor: Michel Emsens, Fraisses, France
[73] Assignee: Emsens Antoine S.A.R.L., France
[21] Appl. No.: 152,402
[22] Filed: Feb. 4, 1988
[30] Foreign Application Priority Data Feb. 4, 1987 [FR] France ................. 87 01658

[51] Int. Cl.⁴ .............. A47J 43/18; A47J 43/00
[52] U.S. Cl. ..................... 99/419; 99/421 R; 99/430; 99/450.2; 100/94
[58] Field of Search ......... 99/450.2, 419, 421 R, 99/421 V, 430; 100/94, 249, 98 A; 17/15; 83/455, 466.1

[56] References Cited

U.S. PATENT DOCUMENTS

| | | | |
|---|---|---|---|
| 3,125,917 | 3/1964 | Smeets | 83/466.1 |
| 3,405,422 | 10/1968 | Sico et al. | 17/15 |
| 4,170,933 | 10/1979 | Meamber | 99/419 X |
| 4,352,242 | 10/1982 | Plet | 17/15 X |
| 4,583,263 | 4/1986 | Wigley, Jr. | 17/15 |
| 4,604,771 | 8/1986 | Dollé | 17/15 X |
| 4,714,014 | 12/1987 | Hartl et al. | 99/450.2 |

FOREIGN PATENT DOCUMENTS 98451 1/1984 European Pat. Off. ......... 17/15
2574252 6/1966 France .

Primary Examiner—Stephen Marcus
Assistant Examiner—Christine A. Peterson
Attorney, Agent, or Firm—Eric P. Schellin

[57] ABSTRACT

Machine for the automatic production of meat and/or vegetable kebabs threaded onto skewers.

The object of the invention relates to the sector involving the shaping or treatment of food products.

According to this addition, the arrangements taking the skewers (20) are made up of a plurality of tubes (38) corresponding to the perforations of the container lid, the said tubes (38) being fixed at one end into holes made out in the thickness of a coupling plate (38b) making up a guiding and positioning assembly for the said skewers.

6 Claims, 6 Drawing Sheets

MACHINE FOR THE AUTOMATIC PRODUCTION OF MEAT AND/OR VEGETABLE KEBABS THREADED ONTO SKEWERS

FIELD OF THE INVENTION

Machine for the automatic production of meat and/or vegetable kebabs threaded onto skewers.

The object of the invention relates to the sector involving the shaping or treatment of food products.

BACKGROUND OF THE INVENTION

The machine is the type comprising a skewering device axially positioned above the container taking the various layers of meat, of such a configuration and vertically controlled at the top to enable the insertion of all the skewers which are vertically positioned in the arrangements on the top face of the container which acts as a lid, so that the said skewers rest against the layers of meat and/or vegetables. This type of machine is divulged for example in patents FR No. 2.535.169, 2.572.894 and 2.574.252. Although there are different embodiments, each of the machines described require prepiercing elements by means of sharp rods, so as to ensure a perforation through different layers of meat to facilitate inserting in a second operatory phase of the skewers. It can be seen that this reduces the pace of production, and in addition, creates very random results. In fact, as the prepiercing of layers of meat and insertion of the skewers is not simultaneous, a deviation of the said skewers which no longer follow the guiding holes can frequently arise.

SUMMARY OF THE INVENTION

The invention is aimed at remedying these disadvantages in a simple, efficient and rational manner, whilst simplifying the structure of the skewering device, in particularly, by suppressing the prepiercing operation, with the pace of production and quality of results obtained as an objective.

The problem brought out wherein the arrangements taking the skewers comprise several tubes corresponding with the perforations of the container lid, the said tubes being fixed at one end into holes made out in the thickness of a coupling plate making up a guiding and positioning assembly for the said skewers.

In an advantageous manner and in order to solve the problem brought up, the following features should be noted;

- the tube length is determined so that after positioning in the perforation of the container lid, resting on the layers of meat and/or vegetables, the skewers project a certain length from the coupling plate.
- the skewering device comprises a horizontal support plate fixed to control means for vertical movement, the said plate receiving a free sliding thrust means, adjustable in function of the length of the part projecting from the skewers and likely to be applied against the plate, the said means being controlled by a compression means.
- the support plate is integral with a support stirrup whose horizontal leg takes the compression means of the thrust component in the form of a cylinder, the said component having above the plate, a base plate integral to the ram rod and taking, in a fixed manner, particularly in the corners, centring and support pins cooperating by freely sliding into the corresponding holes formed in the thickness of the plate and likely to project from it after action from the pressure cylinder.
- the control means of the support plate is a cylinder whose rod is coupled to a cross bar with ends integral to a guiding column sliding in the frame and the far end of which is integral with another cross bar coupled to the said plate,
- the support plate has temporary vertical gripping means likely to cooperate with arrangements on the coupling plate of the tubes with a view to ensuring the upward movement of the tube assembly during the lifting up of the skewering device.

BRIEF DESCRIPTION OF THE DRAWINGS

Considering these arrangements, the frame of the machines can be extended laterally where the container is inserted, by a horizontal plane shaped and arranged together with the control means in order to automatically provide :
- the positioning of the containers with skewers inside the machine whilst being aligned with the skewering device,
- the withdrawal of the containers after skewering and cutting of different after skewering and cutting of different layers of meat and/or vegetables;
- discharge of containers.

The invention is shown hereinafter in more detail with the help of drawings which represent only one embodiment.

FIGS. 1, 2, 3, 4, 5, 6, 7, 8, 9, 10 are purely schematic views illustrating the main operating phases; in order to clarify drawings, only one skewer is shown.

DETAILED DESCRIPTION OF THE INVENTION

Figure 1:
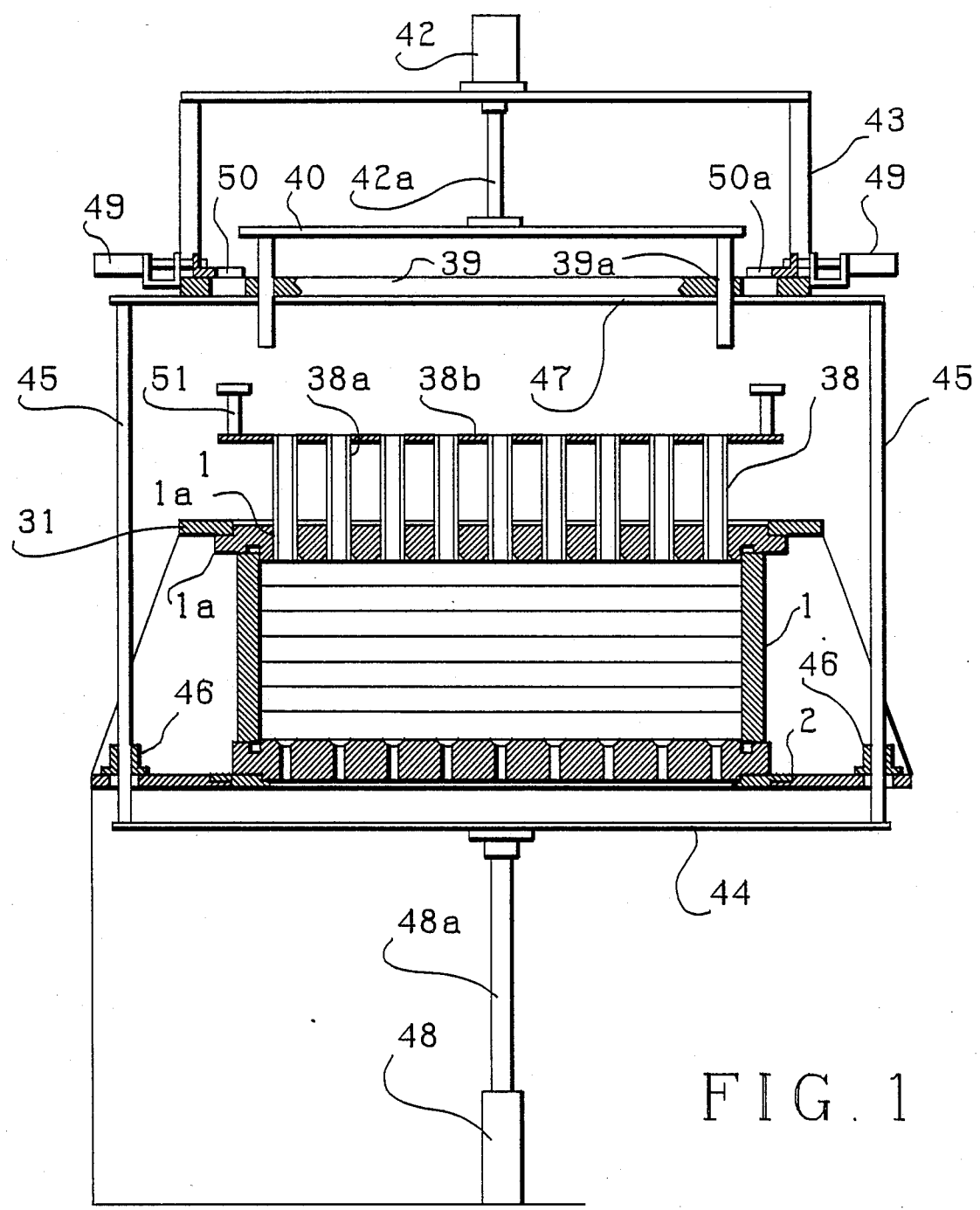
FIG. 1 is a sectional view of the machine.

In a known manner, the different layers of meat and/or vegetables are stacked inside a container (1). The top part of the container (1) takes a lid (1a) which is arranged of such a thickness so as to enable vertical positioning and take a plurality of skewers (20). The vertical holes (1a1) taking the skewers (20), are countersunk at each end. The lid (1a), is centered inside the container (1), and is applied against the walls.

According to the invention, the skewers (20) are placed in a plurality of tubes (38) corresponding to the vertical holes (1a1) of the lid. One of the ends of the tubes (38) is fixed in a hole (38a) made out in the thickness of a plate (38b) to make up an assembly to guide the tube holder and preposition skewers (20).

The tube holder assembly (38) is destined to be engaged by the free end of the said tubes, into the holes (1a1) of the lid (1a), applied against the layers of meat and/or vegetables previously arranged inside the container. The insertion of the skewers (20) after positioning the tube holder assembly in the lid (1a1) is therefore carried out from the plate (38a). The length of the tube (38) is determined so that after positioning in the lid (1a), the inserted skewers (20), applied against the layers of meat, project a certain length (x) from the plate (38b). This is a very slight projecting part (x) in respect to the total length of the skewers (20). For guidance, the part (x) substantially represents a quarter of the length of the skewer.

Considering this design, the skewering device coaxially arranged above the container, comprises a support plate (39) arranged in a horizontal plane and fixed to a control means (48) so as to be moved vertical. The plate (39) takes a freely sliding support component and thrust adjustable in function of the projecting part (x) of the skewers, and likely to be applied against the plate (39). Thus thrust component is made up of a base plate (40) arranged above the plate (39) with, in particular in its corners, centering and support pins (41) cooperating by freely sliding into corresponding holes (39a) made out in the thickness of the said plate (39). The base plate (40) is coupled to the rod (42a) of a cylinder (42) whose barrel is fixed to a stirrup (43) integral with the plate (39) and above this plate.

The control means (48) of the plate (39) is a cylinder coaxially arranged inside the machine frame underneath the container. The rod (48a) of this cylinder is integral with a cross bar (44) which has vertical guiding columns (45) at each end likely to slide freely into bushes (46). The top free end of the columns (45) is also coupled to a cross bar (47) which is fixed onto the plate (39).

It is to be noted that the arrangement of the guiding columns of the machine frame is determined so that the coupling bar (47) is sensitively arranged according to the diagonals of the plate (39).

In order to ensure the upward movement of the tube holder, the plate (39) has temporary gripping means likely to cooperate with arrangements which are provided with the coupling plate (38b) of the tubes (38). For this purpose, the plate (39) has, preferably on at least two parallel sides, a cylinder (49) the rod of which is coupled to a shoe (50) which has a notch (50a) likely to cooperate with a rod with a shoulder (51) projecting from the top face of the plate (38b).

The shoe (50) is applied against the plate (39) which is provided with an opening for engagement and the projection of the rod with a shoulder (51).

In the rest position, the thrust and centering pins (41) project from the face underneath the plate (39), very slightly less than the projecting part (x) of the skewers positioned in the tubes (38).

The bottom of the container (1) is positioned and centered in a plate (2) which is mounted, turning in a part appropriate of the frame, whereas the top part of the said container, particularly the lid (1a), is positioned in a fixed supporting and centering plate (31) integral with the frame. The base plate (31) and the lid (1a) of the container are arranged in such a combination so as to enable the circular pivoting of the said container (1) mounted in the rotary plate.

In front of and in register with vertical slits which the container (1) is provided with in a known manner, a cutting device of any known, suitable kind, is provided so as to ensure the cutting through all the layers of meat inside the container in one single operation.

The operation of the machines shall now be analysed.

After having filled the container (1) with various layers of meat and/or vegetables, the skewer guiding and positioning assembly is positioned in the holes (1a1) of the lid (1a), the tubes (38) being applied against the end layer(s) of the meat. The skewers (20) are either manually or automatically inserted into the tubes (38) from the plate (38b), the said skewers, applied against the end layer(s) of meat, project a length (x) from the plate (38b) as shown.

The container (1) is then inserted into the centering and positioning means of the frame i.e. the rotary plate (2) and the support and centering plate (31). It is to be noted that the container (1) can be inserted into the machine either manually or automatically.

It is to be pointed out that the guiding tube assembly (38) and skewers (20) can be positioned after inserting the container (1) into the plate (2) and the base plate (31).

Figure 2:
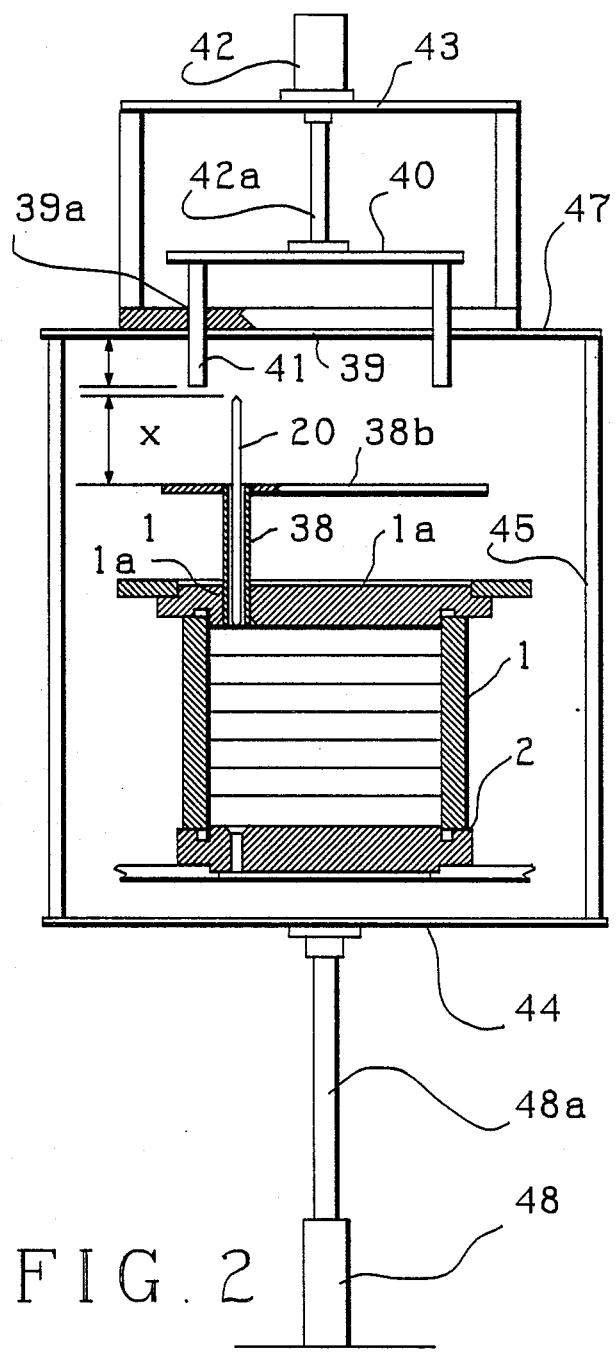
Figure 3:
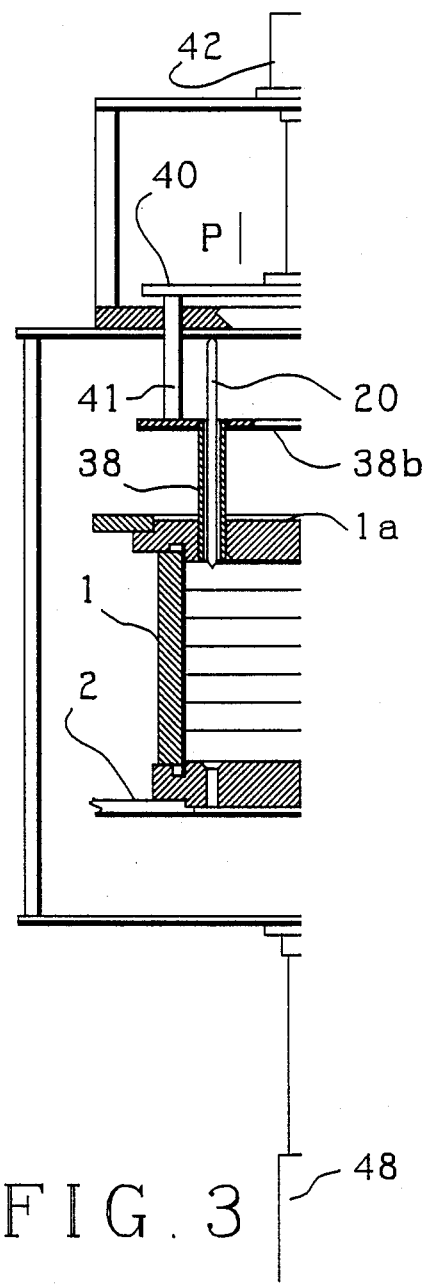

At this stage, the support and thrust pins (41) of the base plate (40), project from the face underneath the support plate (39) only very slightly less than the projecting part (x) of the skewers (FIG. 2).

The main control cylinder (48) and the servo-controlled cylinder (42) of the thrust component (40-41) are operated so as to start off the lowering of the skewering device assembly. It is to be noted that the cylinder (42) applies pressure (P) onto the plate (40), prohibiting, at this stage, the operation of a relative movement of the pins (41) integral to the base plate and the plate (39).

Figure 4:
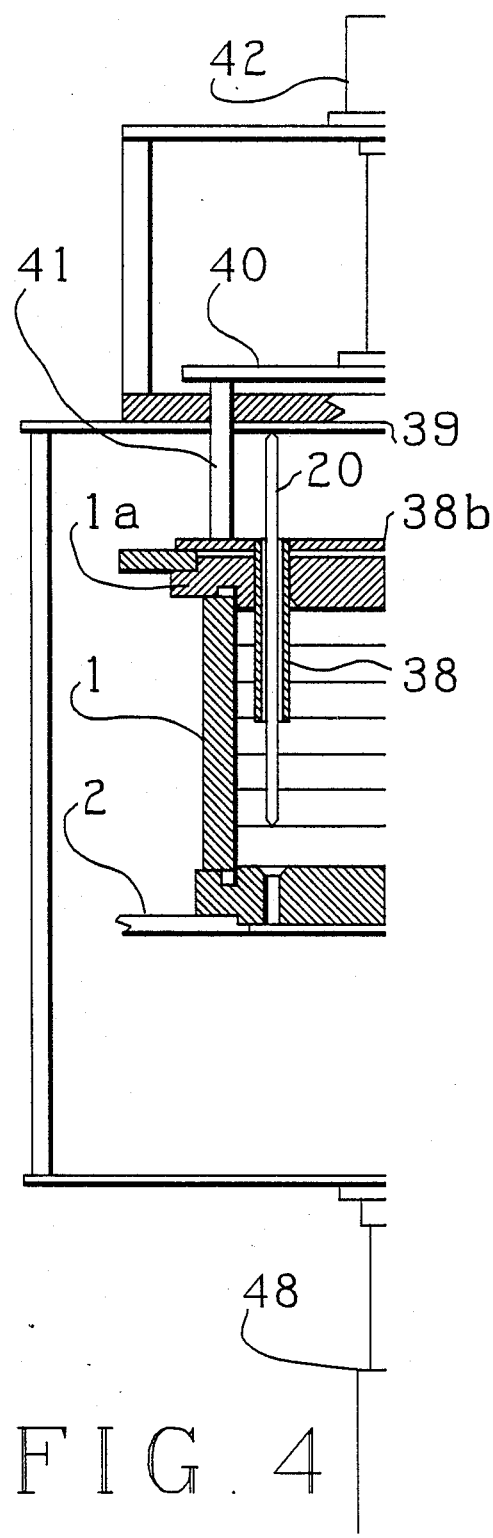
Figure 5:
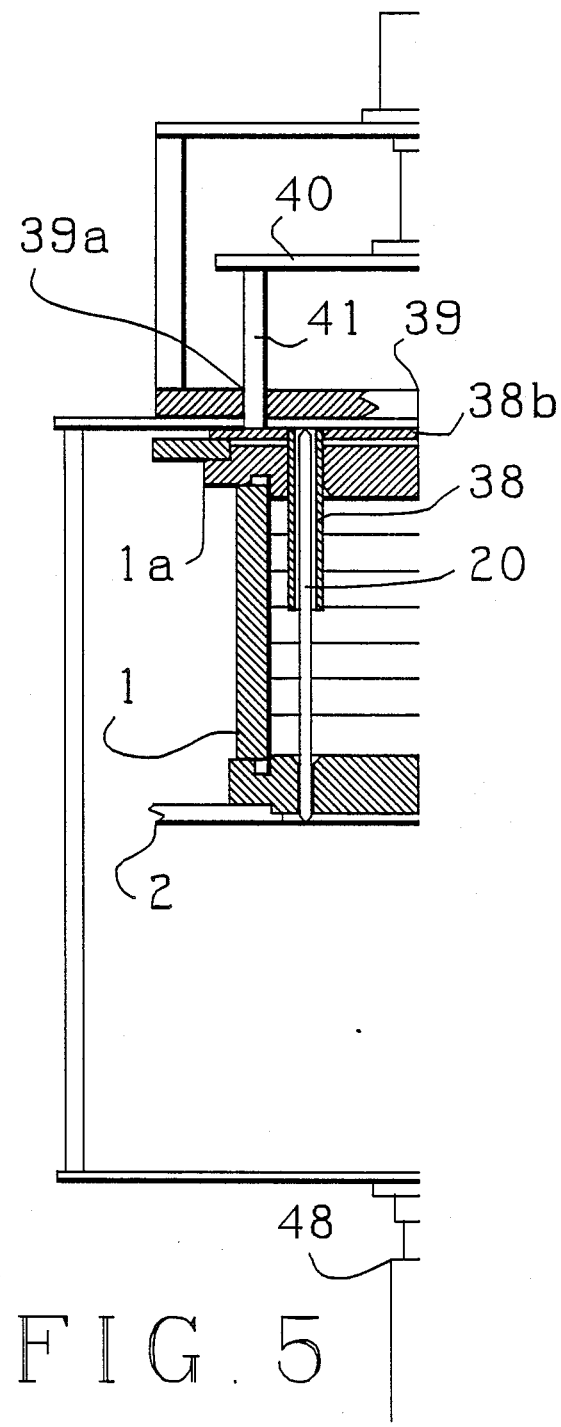

Considering that the length of the projecting part of the pins (41) is very slightly less than the distance (x), the plate (39) is firstly applied against the assembly of skewers (20) to make them project from the free end of tubes (38) in the region of 10 mm up to abutment of pins (41) on the top face of the coupling plate (38b) (FIG. 4). Then, the combined action of the cylinders (48) and (42) ensures the simultaneous penetration of the skewers (20) and tubes (38) into the various layers of meat until abutment of the coupling plate (38b) on the lid (1a1) of the container (FIG. 4). Then, in the opposite direction, the cylinder (42) is controlled so as to suppress the pressure action and finish inserting the projecting part (x) of the skewers under the effect of pressure of plate (39) controlled by the cylinder (48) (FIG. 5). A relative sliding movement of the plate (39) and pins (41) of the plate (FIG. 5) takes place.

It is to be noted that the thickness of the lid (1a1) and the plate (1b) of the container (1) as well as the projecting length (x) of the skewers, is suitably determined so that after the insertion of the skewers (20), they project sufficiently from the layer(s) of meat arranged on the said plate. A plurality of integral or built up pins can also be provided on the lower face of the plate (39) which are likely to be engaged in the top part of the tubes when the plate is applied against the lid, in order to finish inserting the skewers (20).

Figure 6:
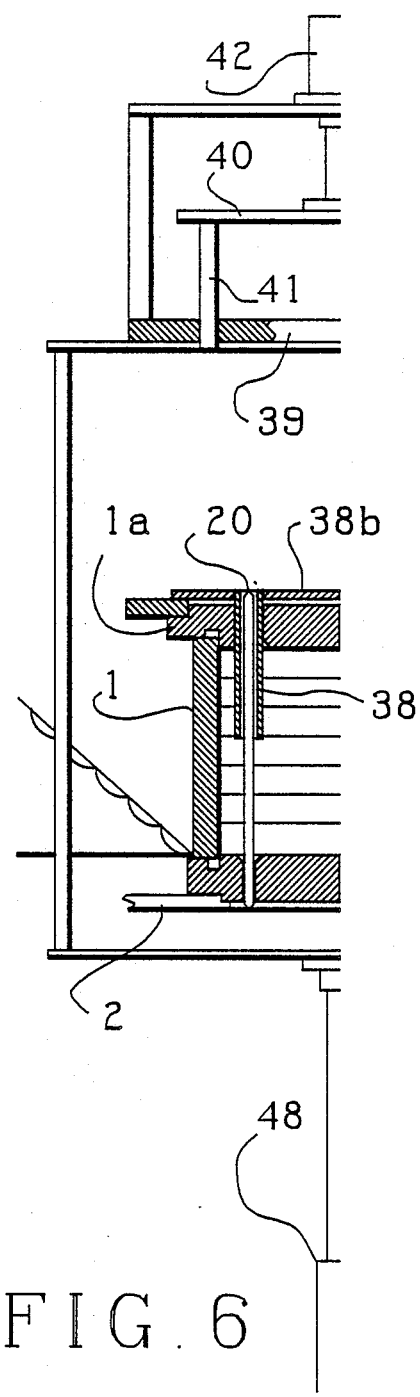

The skewering device assembly is next raised by operating the cylinders (42) and (48) so that the relative positioning of the plate (39) and base plate (40) with the pins (41) is the same as the position after inserting the skewers (FIG. 6).

The cutting device is then operated to carry out an initial cutting operation then a second one over an orthogonal plane after having circularly indexed the container (1). The cutting operations are not described in detail as they are executed in a known manner.

Once the cutting operations are over, the tube holder assembly (38) is then raised.

Figure 7:
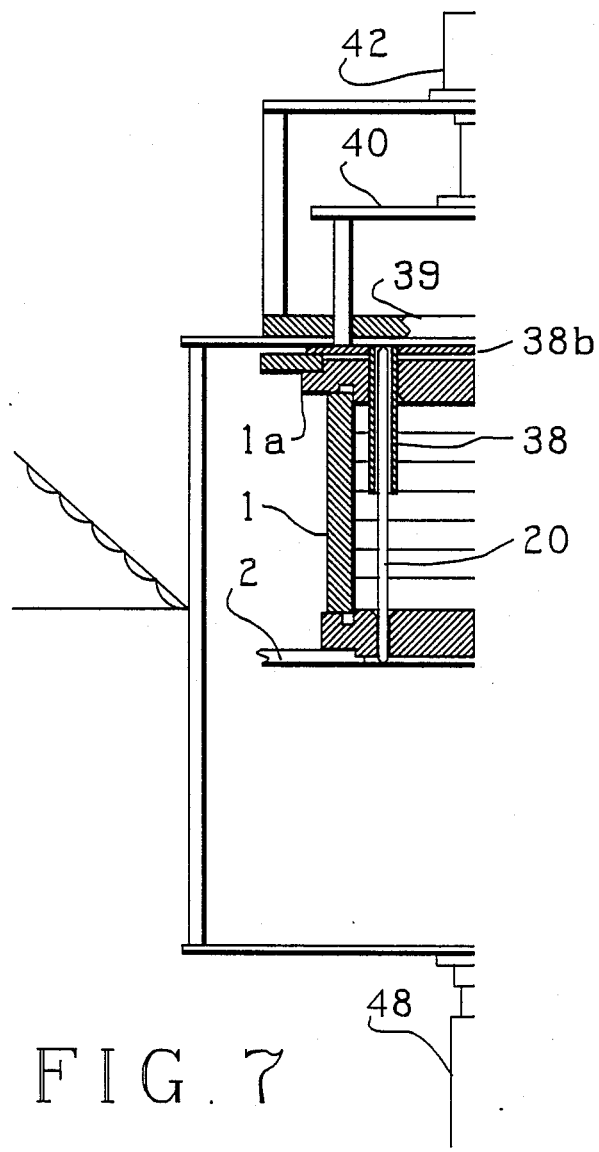
Figure 8:
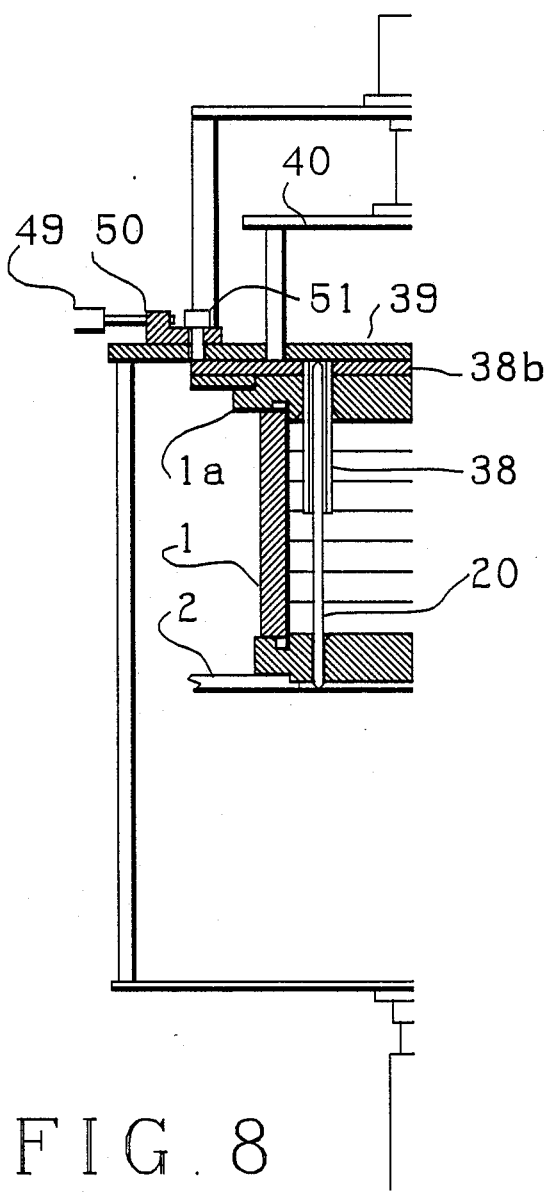

For this purpose, while the knives are withdrawn after having carried out their second cutting operation, the skewering device assembly is lowered once again (FIG. 7) still in the same relative position of the plate (30) with respect to the base plate (40).

The cylinders (49) are then controlled in order to start up the translatory movement of their respective gripping shoes (50) which are engaged under the shouldered head of the rods (51) which project from the plate (39) (figure B).

Figure 9:
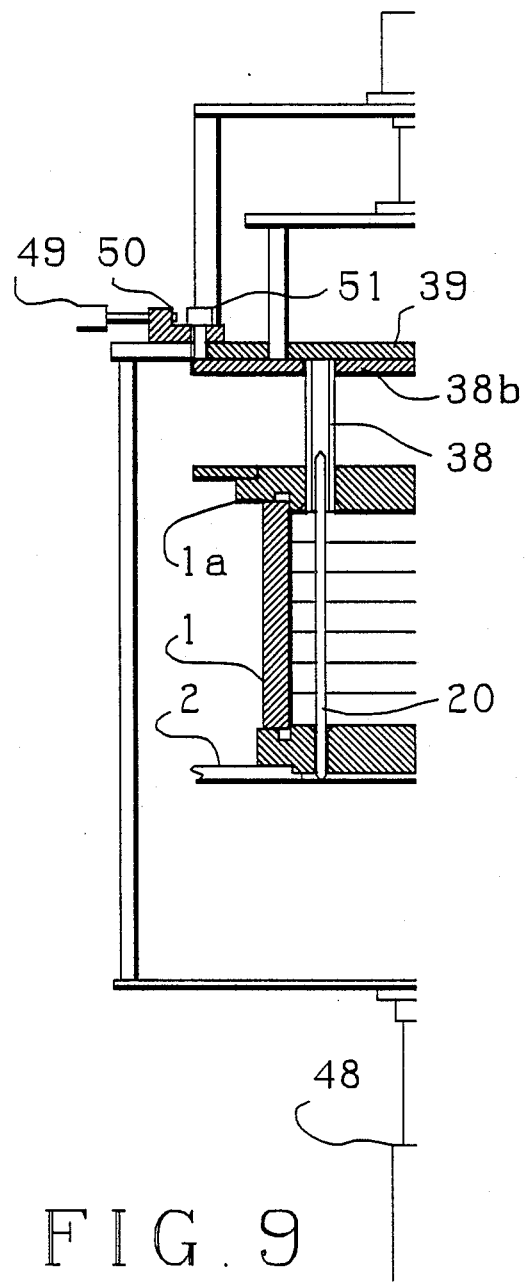

The skewering device assembly is then raised again, the tube holder (38) being gripped to the plate (39) until the said tubes are released from the top layer(s) of meat, but remain positioned in the thickness of the lid (FIG. 9). The skewers (20) remain inserted in the different layers of meat taking into account the projecting part of the end of the tube after skewering. The meat fibres retighten over the said skewers as the tubes slide towards the top.

Figure 10:
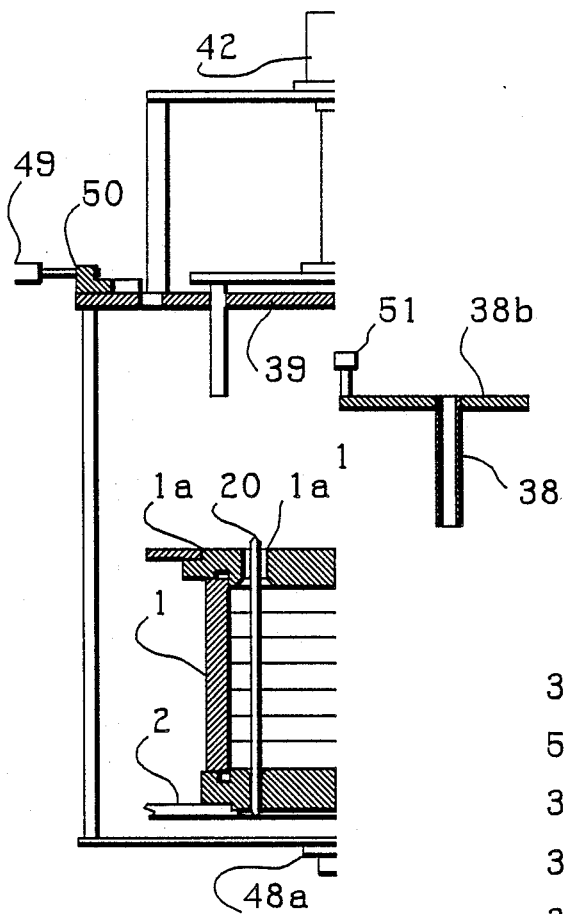
Figure 11:
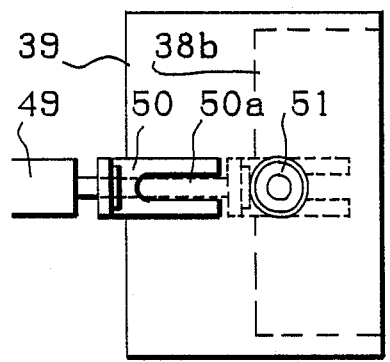
FIG. 11 is a partial plan view showing the arrangement of the tube holder assembly.
Figure 12:
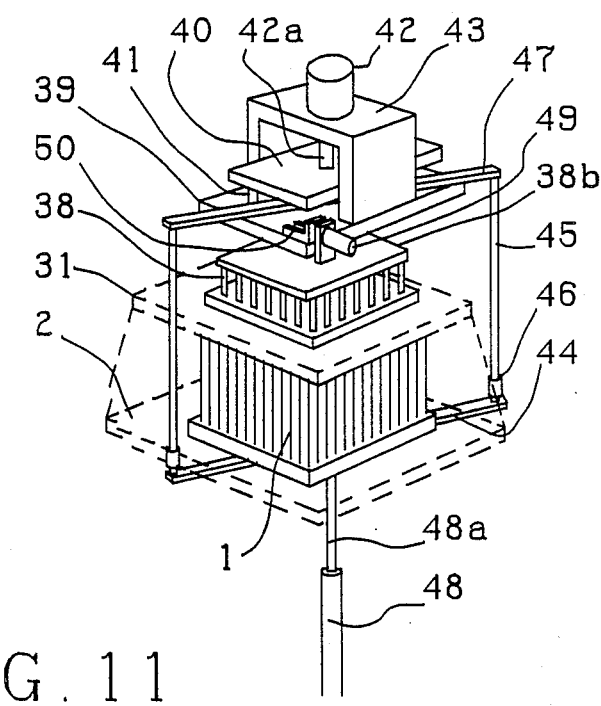
FIG. 12 is a schematic perspective view of part of the machine, the skewering device in particular.

The cylinders (49) are then controlled in the opposite direction so as to release the tube holder (38) which remains positioned in the lid, applied against the top layers of meat. Then, you just have to raise the skewering device assembly (FIG. 10) and replace the plate and put the pins back into the initial cycle start position (FIG. 2).

I claim:

1. Machine for the automatic production of layers of meat and/or vegetables threaded onto skewers in which the skewering device is axially positioned, comprising a container (1) having plural,
    stacked layers of meat, skewers (20) vertically positioned in vertical holes (1a1) on a top face of a cylinder which acts as a lid (1a) to allow said skewers (20) to rest against the plural layers of meat and/or vegetables; said machine having arrangements taking the skewers (20) that are made up of a plurality of tubes (38) which correspond with perforations in a lid of the container,
    the said tubes being fixed at one end into holes made out in the thickness of a coupling plate, which makes up a guiding and positioning assembly for said skewers;
    said tubes (38) being of a length that after they are positioned in perforations of the container lid and applied against the layers of meat and/or vegetables, the skewers (20), project a length (x) from the coupling plate; and wherein
    said skewering device comprises a horizontal support plate (39) fixed to control means for vertically and simultaneously driving from above, both skewers and tubes
    said plate taking a free sliding thrust means, adjustable in function of the length (x) of part projecting from the skewers and to be applied against the plate, said means being controlled by a compression means.

2. Machine according to claim 1 wherein the length of tubes (38) is such that after they are positioned in the perforations of the container lid and applied against the layers of meat and/or vegetables, the skewers (20), project a length (x) from the coupling plate.

3. Machine according to claim 1
    wherein the control means for the support plate (39) is a cylinder (48) the rod of which is coupled to a cross bar with ends integral to a guiding column sliding in the frame and the far end of which is integral with another cross bar coupled to the said plate (39).

4. Machine according to claim 1 wherein the support plate (39) has temporary gripping means
    that cooperate with arrangements on the coupling plate (38b) of tubes (38) to ensure the upward movement of the tube assembly during the lifting upwards of the skewering device.

5. Machine according to claim 4 wherein the gripping means comprise forks (50) fixed to cylinders (49) to be moved in translation
    cooperating with rods with shoulders (51) projecting from the coupling plate of the tubes.

6. Method for operating the machines of claims 1 or 5-7 to produce meat and/or vegetables threaded onto skewers; comprising;
    positioning of the skewer (20) guiding and positioning assembly into perforations of the container lid; applying tubes (38) against different layers of meat and/or vegetables previously placed inside the container;
    vertically inserting skewers (20) inside tubes (38) through the coupling plate; said skewers being applied against the layers of meat and or vegetables,
    inserting the container (1) previously filled with different layers of meat and/or vegetables into the machine in a manner so that it is positioned on a rotary plate (2) and the supporting and centering plates (31);
    controlling the cylinder (48) of the support plate (39) and building up the pressure inside the cylinder (42) of the thrust component to ensure reduced vertical insertion of skewers (20) and the downward movement of the tube assembly and skewers (20) to the layers of meat; said skewers remaining projecting from the coupling and thrust plate (38b) along with the support plate (39), the pins (41) of the plate (40) abutting with the said plate (38b),
    controlling the opposite direction of the cylinder (42) of the thrust component to enable the skewers to be inserted under the pressure of the plate (39),
    controlling the opposite direction of the cylinder (48) for the upward movement of the plate (39) and thrust component,
    cutting through the various layers of meat in two orthogonal planes,
    controlling the opposite direction of the cylinder (48) in order to relower the plate (39) and thrust component assembly to be in contact with the plate (38b),
    controlling the opposite direction, of the cylinder (48) in order to raise the plate (39) and thrust component assembly to which the guiding tube holder is attached until the said tubes are released from the top layer(s) of meat but remain positioned in the thickness of the cover,
    controlling the opposite direction of the locking cylinder
    end of the upward movement of the plate and thrust component assembly; and
    controlling the cylinder (42) of the thrust component to position the pins projecting into the thickness of the plate.

* * * * *